(12) United States Patent
Müller et al.

(10) Patent No.: US 6,262,204 B1
(45) Date of Patent: *Jul. 17, 2001

(54) INITIATION SYSTEM COMPRISING A HETEROCYCLIC LIGAND FOR ANIONIC POLYMERIZATION OF (METH)ACRYLIC MONOMER(S) AND POLYMERIZATION PROCESS USING SAME

(75) Inventors: Axel H. E. Müller, Wiesbaden; Andreas R. Maurer, Weilrod, both of (DE); Christophe Navarro, Bidache (FR)

(73) Assignee: Atofina (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/058,478

(22) Filed: Apr. 10, 1998

(30) Foreign Application Priority Data

Apr. 10, 1997 (FR) .................................................. 97 04470

(51) Int. Cl.[7] ....................................................... C08F 4/46
(52) U.S. Cl. ...................................... 526/181; 526/318.4
(58) Field of Search .................................. 526/318.4, 181

(56) References Cited

U.S. PATENT DOCUMENTS

| | | |
|---|---|---|
| 4,243,787 | 1/1981 | Boileau et al. . |
| 4,351,924 | 9/1982 | Andrews et al. . |
| 5,677,387 | 10/1997 | Bayard et al. . |
| 5,686,534 | 11/1997 | Bayard et al. . |

*Primary Examiner*—Bernard Lipman
(74) *Attorney, Agent, or Firm*—Pennie & Edmonds LLP

(57) ABSTRACT

The present invention relates to an initiation system comprising at least one initiator, with the exception of amides of alkaline metals, and at least one alkaline metal alcoholate of the formula ROM, in which M is an alkaline metal and R represents a group $$Q-R^1-(OR^2-)_m$$

wherein Q is a heterocyclic compound with 5 or 6 chain links, substituted or not, having 1 or 2 oxygen atoms as heteroatoms, $R^1$ and $R^2$ represent an alkylene group, linear or branched at $C_1-C_4$, and m is equal to 0, 1, 2 or 3. The present invention also relates to the application of the initiation system to the preparation of (meth)acrylic (co) polymers and, possibly, ethylenically unsaturated monomers that can be copolymerized with (meth)acrylic monomers.

24 Claims, No Drawings

INITIATION SYSTEM COMPRISING A HETEROCYCLIC LIGAND FOR ANIONIC POLYMERIZATION OF (METH)ACRYLIC MONOMER(S) AND POLYMERIZATION PROCESS USING SAME

TABLE OF CONTENTS

1. Background of the Invention
   1.1. Technical Field
   1.2. Description of Related Art
2. Summary of the Invention
3. Description of the Preferred Embodiments
   3.1. Example 1 (a–n)
   3.2. Example 2
   3.3. Example 3 to 5
   3.4. Examples 6, 7, and 8
   3.5. Examples 9 and 10
4. claims
5. Abstract of the Disclosure

1. BACKGROUND OF THE PRESENT INVENTION

1.1. Technical Field

The present invention relates to an initiation system for anionic polymerization of (meth)acrylic monomers and, possibly, ethylenically unsaturated monomers that can be copolymerized with these (meth)acrylic monomers to obtain homopolymers, block or random copolymers and star copolymers comprising arms formed of at least one (meth)acrylic sequence bonded to a core or node formed of a multifunctional compound (for example, a deactivating agent or a monomer lead to a polymer, whether or not cross-linked).

Anionic polymerization of (meth)acrylic monomers is difficult to control as a result of secondary reactions between the monomer and the initiator and/or the ends of growing anionic chains or due to termination and chain transfer reactions.

However, anionic polymerization is of interest in the sense that if it is conducted carefully under controlled conditions, polymers with a well-defined structure result.

1.2. Description of Related Art

Research has been undertaken for better control of (meth)acrylic monomer polymerization and to thus avoid secondary reactions.

Thus, in European Patent Application EP-A-524054, the anionic polymerization of (meth)acrylic polymers in the presence of an initiation system comprising a monofunctional or difunctional initiator and a ligand formed by an alkoxy alcoholate of an alkaline metal is described. With this process, polymerization is well controlled, especially at low temperatures.

An initiation system permitting well-controlled anionic polymerization, which can be used under conditions easy to create in industry and is less costly and, particularly, usable at temperatures closer to ambient temperature, is still being sought.

2. SUMMARY OF THE INVENTION

The present invention relates to an initiation system comprising at least one initiator, with the exception of amides of alkaline metals, and at least one alkaline metal alcoholate of the formula ROM, in which M is an alkaline metal and R represents a group

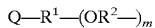

wherein Q is a heterocyclic compound with 5 or 6 chain links, substituted or not, having 1 or 2 oxygen atoms as heteroatoms, $R^1$ and $R^2$ represent an alkylene group, linear or branched at $C_1$–$C_4$, and m is equal to 0, 1, 2 or 3.

The present invention also relates to the application of the initiation system to the preparation of (meth)acrylic (co)polymers and, possibly, ethylenically unsaturated monomers that can be copolymerized with (meth)acrylic monomers.

3. DESCRIPTION OF THE PREFERRED EMBODIMENTS

The inventive initiation system for polymerization of (meth)acrylic monomers and possibly ethylenically unsaturated monomers, which can be polymerized with these (meth)acrylic monomers, is composed of at least one initiator, with the exception of alkaline metal amides, and at least one alcoholate of the formula $$ROM \quad (I)$$

wherein

M represents an alkaline metal,

R represents a group

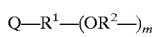

wherein:

Q represents a heterocyclic compound with 5 or 6 chain links comprising 1 or 2 oxygen atoms as the only heteroatom(s), whether or not substituted with an alkyl group with 1 to 8 carbon atoms, a cycloalkyl at $C_5$–$C_8$ or substituted by/or condensed to a heterocyclic compound with 5 to 8 chain links comprising 1 or 2 heteroatoms;

$R^1$ and $R^2$, identical or different, each representing an alkylene group at $C_1$–$C_4$, linear or branched, with $R^1$ being bonded to heterocyclic compound Q at α of an oxygen atom, m is equal to 0, 1, 2 or 3.

In Formula I of the ligand, group Q is preferably a hydrogenated heterocyclic compound and, in particular, can represent a tetrahydrofuranyl-2-, 5-methyltetrahydrofuranyl-2-, tetrahydropyranyl-2-, 1,3-dioxolanyl-2-, 1,3-dioxolanyl5-, 1,3-dioxanyl-2-, 1,3-dioxanyl-6-, 1,4-dioxanyl-2-, 1,4-dioxoaspiro[4,5]decan-2-yl-, 1,7-dioxaspiro[5,5]undecan-2-yl, or 1,5,7,11-tetraoxaspiro[5,5]-undecan-2-yl group.

$R^1$ may, for example, be a methylene, ethylene, propylene, butylene, or isopropylene group, preferably methylene.

$R^2$ may represent, for example, a methylene, ethylene, propylene, butylene, or isopropylene group, preferably ethylene.

m is advantageously equal to 0, 1 or 2.

M preferably represents lithium.

Q may be substituted by or condensed to a heterocyclic compound containing 1 or 2 identical or different heteroatoms, such as oxygen, nitrogen or sulfur.

A particularly useful ligand is lithium tetrahydrofuranyl-2-methoxylate or -2-ethoxylate.

The initiator in the initiation system pursuant to the invention may be any mono- or di-functional initiator for anionic polymerization.

The monofunctional initiator may be selected, in particular, from among compounds of the formula:

$$(R')_p—M' \quad (II)$$

wherein
- M' represents an alkaline metal or an alkaline earth (valence p of 1 or 2); and
- R' designates an alkyl radical with straight or branched chain, containing 2 to 8 carbon atoms, or an aryl radical with one or more cycles, possibly substituted, or an alkenyl radical at $C_2–C_6$ substituted by an aryl or alkylaryl group, or a linear or branched alkyl radical containing 1 to 8 carbon atoms, substituted by at least one phenyl group or an alkylaryl radical, in which the alkyl group has 1 to 8 carbon atoms.

Such monofunctional initiators are, for example, sec.-butyllithium, n-butyllithium, fluorenyllithium, alpha-methylstyryllithium, 1,1-diphenylhexyl lithium, diphenylmethyllithium or -sodium or -potassium, and 1,1-diphenyl-3-methylpentyllithium.

The monofunctional initiator can also be α-lithioisobutyrates.

The difunctional initiators can be of Formula (III)

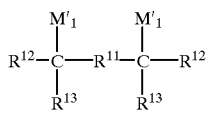

(III)

wherein:
- $M'_1$ is an alkaline metal; and
- $R^{11}$ represents an bivalent organic radical, whether aliphatic, cycloaliphatic, aromatic or containing at least one cycloaliphatic or aromatic group, $R^{11}$ may contain substituents; and
- $R^{12}$ and $R^{13}$ each independently represent a monovalent organic radical, whether aliphatic, cycloaliphatic, aromatic or containing at least one cycloaliphatic or aromatic group, $R^{12}$ and $R^{13}$ may contain substituents.

The difunctional initiator may be selected, in particular, from among compounds such as 1,1,4,4-tetraphenyl-1,4-dilithio-butane and 1,1,4,4-tetraphenyl-1,4-disodiobutane.

One may also use difunctional initiators such as initiator precursors, e.g., lithium naphthalene, sodium naphthalene, potassium naphthalene or homologues thereof. The reaction product from two organomonolithiated initiator equivalents (such as ter.-butyllithium) with 1,3-diisopropenylbenzene can also be used.

The initiator may also be a silylated compound. Monofunctional, it may correspond to the following formula:

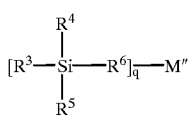

(IV)

wherein:
- $R^3$, $R^4$, $R^5$ each independently represent a linear or branched alkyl radical containing 1 to 8 carbon atoms;
- $R^6$ represents a linear or branched alkylene radical containing 1 to 8 carbon atoms;
- M" designates an alkaline metal or alkaline earth metal (valence q or 1 or 2).

The silylated initiator may also be difunctional, and is then selected in particular from among compounds of Formula (V):

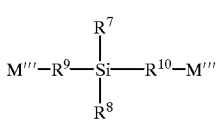

(V)

wherein:
- $R^7$ and $R^8$ each independently represent a linear or branched alkyl radical containing 1 to 8 carbon atoms;
- $R^9$ and $R^{10}$ each independently represent a linear or branched alkylene radical containing 1 to 8 carbon atoms; and
- M''' designates an alkaline metal.

In Formulae (IV) or (V) above, it is preferable for $R^3$, $R^4$, $R^5$, $R^7$ and $R^8$ to each independently represent an alkyl radical with 1 to 4 carbon atoms, quite particularly methyl, and for $R^6$, $R^9$ and $R^{10}$ to each independently represent an alkylene radical with 1 or 2 carbon atoms, in particular the methylene radical, and for M" and M''' to each represent lithium.

The alcoholate/initiator molar ratio in the initiation system pursuant to this invention may vary within rather large limits. The quantity of alcoholate must be sufficient to permit formation of a complex with the living polymerization core and to thus stabilize the latter. The quantity of alcoholate depends on the initiator selected and the monomer(s) to polymerize. The alcoholate/initiator molar ratio pursuant to the invention is generally between 1 and 20; to obtain better results, this ratio preferably falls between 2 and 10.

This invention also concerns a process for anionic polymerization of (meth)acrylic monomers and possibly ethylenically unsaturated monomers that can be copolymerized with these (meth)acrylic monomers, in the presence of an initiation system as defined above.

Polymerization, conducted in the presence of the initiation system pursuant to the invention, preferably takes place in the absence of moisture and oxygen, and in the presence of at least one non-protonic solvent, preferably selected from among benzene, toluene, ethylbenzene, tetrahydrofuran, diglyme, tetraglyme, orthoterphenyl, biphenyl, decaline, tetraline or mixtures thereof; toluene or ethylbenzene may be used advantageously. A mixture of toluene-tetrahydrofuran or ethylbenzene-tetrahydrofuran that can contain up to 10% by volume of tetrahydrofuran may also be used.

The polymerization temperature may vary between –100° C. and +100° C., approximately, and preferably will be below about –20° C. for acrylates and +30° C. for methacrylates.

The initiation system pursuant to the invention permits complete conversion of the monomers within a period of less than, and generally much less than, 30 minutes; the time depends on the temperature. In the case of polymerization of acrylates, this time may be much less than one second.

Polymerization pursuant to the invention is possible in batch-type or tube reactors, but is not limited to them.

It may be conducted continuously, as described in Patent Application EP-A-749987 and, in this case, the monomer(s) to be polymerized and the initiation system are first mixed in a micro-mixer (for instance, a micro-mixer of the cyclone or tangential jet type, or the impact-jet type), and the mixture is then injected into the (co)polymerization reactor. The dwell time of the monomer(s) and the initiation system in the micro-mixer is less than the (co)polymerization time.

Polymerization may take place under adiabatic conditions. This is interesting since no energy need be provided during the course of polymerization.

To obtain (co)polymers from living (co)polymers resulting from the anionic polymerization pursuant to the invention, the latter are deactivated by reaction with a source of protons, consisting notably of an alcohol, water or a protonic acid. Then the (co)polymer obtained may be trans-esterified or hydrolyzed in an acid medium.

Using the process pursuant to the invention, homopolymers, random copolymers or block copolymers or star polymers comprising arms formed from block or random (co)polymers can be produced.

The monomers that can be (co)polymerized by the process pursuant to the invention are selected in particular from the group composed of (meth)acrylic monomers.

The term "(meth)acrylic monomer", as used here, means a monomer selected from among (meth)acrylates of the following respective formulae:

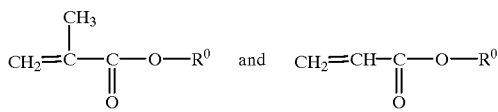

wherein $R^0$ is selected from among alkyl radicals at $C_1$–$C_{18}$, linear or branched, primary, secondary or tertiary, cycloalkyl at $C_5$–$C_{18}$, alkoxyalkyl and alkylthioalkyl, wherein the alkyl groups, linear or branched, have 1 to 8 carbon atoms, aryl and arylalkyl, these radicals possibly being substituted by at least one atom of fluorine and/or at least one hydroxyl group after protection of this hydroxyl group; the (meth) acrylates of glycidyl, norbornyl, isobornyl, mono- and di-(alkyl at $C_1$–$C_8$)-(meth)acrylamides.

As examples of usable methacrylates, we can cite the methacrylates of methyl, ethyl, 2,2,2-trifluoroethyl, n-propyl, isopropyl, n-butyl, sec.-butyl, tert.-butyl, n-amyl, i-amyl, n-hexyl, 2-ethylhexyl, cyclohexyl, octyl, i-octyl, nonyl, decyl, lauryl, stearyl, phenyl, benzyl, β-hydroxyethy, isobornyl, hydroxypropyl and hydroxybutyl. The preferred methyacrylic monomer is methylmethacrylate.

As examples of acrylates of the above formula, we can cite the acrylates of methyl, ethyl, n-propyl, isopropyl, n-butyl, sec.-butyl, tert. -butyl, hexyl, 2-ethylhexyl, isooctyl, 3,3,5-trimethylhexyl, nonyl, isodecyl, lauryl, octadecyl, cyclohexyl, phenyl, methoxymethyl, methoxyethyl, ethoxymethyl and ethoxyethyl.

The monomers that can be (co)polymerized with the (meth)acrylic monomers are ethylenically unsaturated monomers, such as vinylaromatic monomers, possibly halogenated or substituted, diene monomers, vinylidene monomers, olefin monomers, vinyl-2- and vinyl-4-pyridines, vinylsilanes, vinyl aldehydes, vinylketones, vinyl sulfoxides and alkylcyanoacrylates, Heterocyclic monomers can also be used.

Vinylaromatic monomer, in the sense of this invention, means an aromatic ethylenically unsaturated monomer, such as styrene, vinyltoluene, α-methylstyrene, methyl-4-styrene, methyl-3-styrene, methoxy-4-styrene, hydroxymethyl-2-styrene, ethyl-4-styrene, ethoxy-4-styrene, dimethyl-3,4-styrene, tert.-butyl-3-styrene and vinyl-1-naphthalene.

Diene monomer means a diene selected from among the linear or cyclic dienes, conjugated or unconjugated, such as, for example, butadiene, 2,3-dimethyl-butadiene, isoprene, 1,3-pentadiene, 1,4-pentadiene, 1,4-hexadiene, 1,5-hexadiene, 1,9-decadiene, 5-methylene-2-norbornene, 5-vinyl-2-norbornene, 2-alkyl-2,5-norbornadienes, 5-ethylene-2-norbornene, 5-(2-propenyl)-2-norbornene, 5-(5-hexenyl)-2-norbornene.

As an olefin monomer, we can cite ethylene.

In particular, the initiation system pursuant to the invention permits preparation of methyl polymethacrylates (PMMA) with an average molar mass in number ($\overline{Mn}$) between 200 and $10^6$ g/mol, inclusive, an a polymolecularity index Ip ($\overline{Mw}/\overline{Mn}$) between 1.05 and 2.6. The PMMAs may have percentages in syndiotactic triads equal to or greater than 70% even in an apolar or mostly apolar solvent, which gives them a vitreous transition temperature of about 130° C. and thus higher heat resistance than PMMAs prepared by radical polymerization.

It is also possible to obtain alkylacrylate polymers with average molar masses in number ($\overline{Mn}$) between 500 and 500,000 g/mol, inclusive, and an Ip between 1.05 and 2.6, inclusive. These homopolymers are living, which allows block copolymers to be prepared.

The following examples illustrate this invention, without, however, limiting the scope thereof. In the examples, the following abbreviations were used:

MMA and PMMA=methylmethacrylate and poly (methylmethacrylate)
TMSM-Li=trimethylsilylmethyllithium;
THFM-Li=lithium tetrahydrofuranyl-2-methoxylate;
DPE=1,1-diphenylethylene;
BuLi=n-butyllithium;
DPH-Li=1,1-diphenylhexyl lithium;
THF=tetrahydrofuran;
$[A]_o$=initial concentration of initiator (TMSM-Li);
$[A']_o$=initial concentration of initiator (DPH-Li);
$[L]$=concentration of ligand;
$[M]_o$=initial concentration of monomer;
$M_o$=molar mass of monomer;

$$\overline{Mn}_{theoretical} = M_0 \times \frac{[M]_o}{[A]_o} \times Xp$$

$$\text{Initiator efficiency } (f) = \frac{\overline{Mn}_{theoritical}}{\overline{Mn}_{experimental}}$$

The molar masses and the Lp ($\overline{Mw}/\overline{Mn}$) are based on GPC measurements, as indicated in Example 1. In this example, the calculation method for the Xp conversion of the monomer is also shown.

3.1. EXAMPLES 1 (a–h)

Poly(methylmethacrylate)

Methylmethacrylate is polymerized in a tube reactor, in the absence of moisture and oxygen, using trimethylsilylm-ethyllithim (TMSM-Li) as initiator (A) in the presence of lithium tetrahydrofuran-2-methyoxylate (THFM-Li) as ligand (L)

All traces of impurities (moisture, oxygen, etc.) are avoided in the system; for this, all reagents are purified as described below, degasified and held under pure nitrogen.

Methylmethacrylate (MMA) is first dried over calcium hydride (CaH$_2$) and distilled under reduced pressure (45 mbars) in the presence of octadecyl 3-(3,5-di-tert.-butyl-4-hydoxyphenyl)propionate as a non-volatile polymerization inhibitor. After degasification, it is stirred for at least one night over CaH$_2$ chilled in a water bath, degasified again and stored at −18° C. It is then distilled from the CaH$_2$ just before use.

1.0 Molar TMSM-Li was used in the pentane.

The toluene and THF were fractionated, then heated to reflux over potassium and introduced into a round-bottom flask linked to piping under vacuum. After degasification, the mixture was stirred with 5 ppm of benzophenone over a sodium/potassium alloy (⅓) until the solution turns blue; it was then distilled again just before use.

N-octane was used as the internal standard for gas-phase chromatographic analysis of the residual monomer. It was degasified, dried by stirring over a sodium/potassium alloy (⅓) with 5 ppm of benzophenone and distilled in a funnel equipped with a Téflon® valve.

1.2 ml of tetrahydrofuran-2-methanol and 1 drop of 1,1-diphenylethyl (DPE) were added to 35 ml of toluene and chilled to 0° C. 8.2 ml of n-butyllithium (1.6 M in hexane) were then added drop by drop to the mixture under pure nitrogen until a slight reddish color remained.

In a glove box, 0.5 ml of initiator (A) (TMSM-Li) and 7.1 ml of ligand (L) (THFM-Li) was added, in a first funnel, to 250 ml of toluene ($[A]_0=10^{-3}$ mol/l; $[L]/[A]_0=4$). A second funnel, equipped with a Téflon® valve, was filled with 21.4 ml of MMA, 8.6 ml of n-octane and 470 ml of toluene ($[M]_0=0.2$ mol/l). A third funnel, equipped with a Téflon® valve was filled with a termination agent, i.e., a solution of methanol acidified by acetic acid (0.5% v/v).

These three funnels were linked to the storage container of a tube reactor. The main parts of the reactor consist of three burettes containing the above reagents. A motor simultaneously operates the plungers of the three burettes and impels the solutions through a mixing chamber (mixing time <1 ms) and a tube reactor. Before reaching the mixing chamber (four-jet mixer with tangential entry, volume of 1 $\mu$l), the solutions are brought to the desired reaction temperature by flowing through 5 m of capillary tubes in a thermostatted water bath. The solutions (initiation system and monomer) then flow into the tube reactor. The dwell time can be set (between $2\times10^{-3}$ and 20 seconds, inclusive) in the by changing the length "I" (4.4 to 500 cm) and the diameter "d" (0.5 to 2 mm) of the tubes or the flow (1.3 to 5 ml/s). At the end of the tube reaction, a sudden-termination tube $T_Q$ is connected that mixes the methanol solution acidified with acetic acid (0.5% v/v) (termination agent) with the reaction solution. The temperature in the mixing nozzle $T_M$ and in the sudden-termination tube $T_Q$ can be set by use of Philips Thermocoax® thermocouples (outside diameter, 0.5 mm).

Temperature $T_{eff}$ is linked by the equation $T_{eff}=T_M+0.55(T_Q-T_M)$ with $T_M$=temperature of the mixture and $T_Q$=termination temperature. This temperature indicates the polymerization temperature.

The exact experiment conditions and results for the system described are given in Table 1 below.

$$X_p = 1 - \frac{\left[\frac{F_{monomer}}{F_{octane}}\right]_t}{\left[\frac{F_{monomer}}{F_{octane}}\right]_o}$$

The rest of the crude solutions is treated to obtain pure polymer. The first stage of this treatment consists in evaporation of the solvent(s) and residual monomer in a rotavap at 30° C. Then, the remaining product is dissolved in benzene and filtered through filter paper. Finally, the benzene solution containing the polymer is lyophilized and a gel is obtained.

For GPC measurements, 10 mg of polymer are dissolved in 5 ml of THF containing 20 ppm of toluene as an internal standard. To correct the contraction or expansion of the gel or changes in flow, the elution volume had to be corrected for each sample in relation to the pealk of the internal standard.

$$V_{e,corr} = V_{e,exp} \frac{V_{e,cal,tol}}{V_{e,exp,tol}}$$

$V_{e,corr}$=corrected elution volume
$V_{e,exp}$=experiment elution volume
$V_{e,cal}$tol=elution volume of toluene for standard
$V_{e,exp}$tol=elution volume of toluene for sample
100 $\mu$l of the sample solutions are injected into a combination of columns (solvent: THF, flow: 60 ml/h; 2 columns, 60 cm, 5 $\mu$ PSS-DV Gel, 10 nm) at ambient temperature (UV detectors Jasco-Uvidec 100 III and refraction index Bischoff RI-Detektor 8110). All of the columns are calibrated with standard PMMA.

The GPC elution graphs for the polymers obtained show a high, narrow molar mass pealk.

The efficacy (f) of the initiator at $T_{eff}\approx-20°$ C. was determined from the slope of the curve for mean degree of polymerization in number, as a function of conversion, as being 0.35.

3.2. EXAMPLE 2

Proceed as indicated in Example 1, but 0.5 ml of initiator (A) (TMSM-Li) and 3.1 ml of ligand (L) (THFM-Li) is used in 250 ml of toluene ($[A]_0=10^{-3}$ mol/l; $[L]/[A]_0=2$).

TABLE 1

| Ex | I (cm) | Flow (cm$^3$ · s$^{-1}$) | d (mm) | t (ms) | Conversion $x_p$ | $T_M$ (° C.) | $T_Q$ (° C.) | $T_{eff}$* (° C.) | $\overline{Mn}$ calc. | $\overline{Mn}$ exp. | $\overline{Mw}/\overline{Mn}$ |
|---|---|---|---|---|---|---|---|---|---|---|---|
| 1a | 16 | 3.99 | 1 | 31.5 | 0.16 | −22.0 | −18.5 | −20.1 | 3200 | 9500 | <1.20 |
| 1b | 32 | 3.99 | 1 | 63.0 | 0.26 | −22.0 | −19.0 | −20.4 | 5200 | 16800 | 1.10 |
| 1c | 32 | 2.41 | 1 | 104.2 | 0.37 | −21.0 | −17.0 | −18.8 | 7300 | 19200 | 1.13 |
| 1d | 64 | 3.55 | 1 | 141.4 | 0.47 | −23.0 | −17.5 | −20.0 | 9500 | 29500 | 1.08 |
| 1e | 64 | 2.41 | 1 | 208.5 | 0.61 | −24.0 | −16.5 | −19.9 | 12200 | 36700 | 1.08 |
| 1f | 128 | 3.55 | 1 | 282.7 | 0.69 | −21.0 | −14.0 | −17.2 | 13800 | 46000 | 1.08 |
| 1g | 300 | 4.43 | 1 | 532.1 | 0.97 | −20.0 | −12.0 | −15.6 | 19400 | 54000 | 1.07 |
| 1h | 300 | 2.41 | 1 | 977.3 | 1.00 | −22.0 | −13.0 | −17.1 | 20000 | 53000 | 1.06 |

*$T_{eff}$ + $T_M$ + 0.55 ($T_Q$ − $T_M$) with $T_M$ = temperature of mixture, and $T_Q$ = termination temperature $\overline{Mn}$ in g/mol Immediately after sampling, 1 $\mu$l of crude polymer solution is injected into a gas-phase chromatography device of the Fisons GC 8160 type, capillary column DB-1, length 30 m, inside diameter: 0.53 mm, film thickness 1.5 $\mu$m, FID. The ratio of the peak areas for the residual monomer and the n-octane, respectively $F_{monomer}$ and $F_{octane}$ leads to the conversion $X_p$ of the monomer at time t:

The exact experiment conditions and the results are given in Table 2 below.

The efficacy (f) of the initiator at $T_{eff}\approx-20°$ C. was determined from the slope of the curve for mean degree of polymerization in number, as a function of conversion, as being f=0.10.

The microstructure of the polymer obtained was analyzed by NMR $^1$H. The syndiotactic triad rate was 81%.

TABLE 2

| l (cm) | Flow (cm³·s⁻¹) | d (mm) | t (ms) | Conversion $x_p$ | $T_M$ (°C.) | $T_Q$ (°C.) | $T_{eff}$* (°C.) | $\overline{Mn}$ calc. | $\overline{Mn}$ exp. | $\overline{Mw}/\overline{Mn}$ |
|---|---|---|---|---|---|---|---|---|---|---|
| 32 | 3.99 | 1 | 63.0 | 0.08 | −22.5 | −19.5 | −20.9 | 1700 | 20500 | 1.17 |
| 32 | 2.41 | 1 | 104.2 | 0.13 | −24.0 | −19.0 | −21.3 | 2600 | 29100 | 1.19 |
| 64 | 3.55 | 1 | 141.4 | 0.17 | −22.0 | −18.5 | −20.1 | 3500 | 39000 | 1.12 |
| 64 | 2.41 | 1 | 208.5 | 0.24 | −24.0 | −18.5 | −21.0 | 4800 | 50200 | 1.12 |
| 128 | 3.55 | 1 | 282.7 | 0.31 | −22.0 | −17.0 | −19.3 | 6100 | 67100 | 1.13 |
| 128 | 2.41 | 1 | 417.0 | 0.40 | −24.0 | −16.5 | −19.9 | 8100 | 77000 | 1.19 |

$^5*T_{eff} = T_M + 0.55 (T_Q - T_M)$ with $T_M$ = temperature of mixture, and $T_Q$ = termination temperature $\overline{Mn}$ in g/mol

3.3. EXAMPLES 3 to 5

As in Example 1h, methylmethacrylate (MMA) ($[M]_0=0.2$ mol/l) is polymerized in the presence of an initiation composition containing, as ligand, lithium tetrahydrofuranyl-2-methoxylate (THFM-Li) (L) in toluene as solvent. In these examples, the initiator (A') is 1,1-diphenylhexyl lithium (DPHLi) in solution in an apolar solvent ($10^{-3}$ mol/l) instead of trimethylsilyllithium (TMSM-Li). The experiment conditions and results are given in Table 3.

3.5. EXAMPLES 9 and 10

As in Example 1 h, methylmethyacrylate (MMA) is polymerized in the presence of TMSM-Li (A) and THFM-Li (L).

The molar ratio $[L]/[A]_0$ is equal to 4 and 6, respectively. The solvent medum used is a mixture of toluene and THF.

The experiment conditions and results are indicated in Table 5.

TABLE 3

| Ex. | $[L]/[A']_o$ | Conversion $X_p$ | $T_M$ °C. | $T_{eff}$ °C. | $\overline{Mn}$ calc. | $\overline{Mn}$ exp. | $\overline{Mw}/\overline{Mn}$ | Efficiency |
|---|---|---|---|---|---|---|---|---|
| 3 | 3 | 1.00 | −23 | −20 | 20000 | 95200 | <1.2 | 0.21 |
| 4 | 4 | 1.00 | −23 | −20 | 20000 | 37700 | <1.10 | 0.53 |
| 5 | 5 | 1.00 | −23 | −20 | 20000 | 38100 | <1.05 | 0.53 |

3.4. EXAMPLES 6, 7 and 8

Proceed as in Examples 4 and 5, i.e., the initiation system contains THFM-Li (L) as ligand and DPHLi (A') as initiator. The solvent medium used is a mixture of toluene and THF. The experiment conditions and results are given in Table 4.

TABLE 4

| Ex. | $[L]/[A']_o$ | Toluene/THF (v/v) | Conversion $X_p$ | $T_M$ °C. | $T_{eff}$ °C. | $\overline{Mn}$ calc. | $\overline{Mn}$ exp. | $\overline{Mw}/\overline{Mn}$ | Efficiency |
|---|---|---|---|---|---|---|---|---|---|
| 6 | 4 | 97.5/2.5 | 1.00 | −21 | −20 | 20000 | 37700 | <1.3 | 0.53 |
| 7 | 4 | 95/5 | 1.00 | −22 | −20 | 20000 | 37700 | <1.3 | 0.53 |
| 8 | 5 | 95/5 | 1.00 | −20 | −20 | 20000 | 37000 | <1.2 | 0.54 |

If you compare the results obtained in Examples 4 through 8, you note that the presence of THF does not affect the efficacy (determined at $T_{eff} \approx -20°$ C.).

TABLE 5

| Ex. | $[L]/[A']_o$ | Toluene/THF v/v | Conversion $X_p$ | $T_M$ °C. | $T_{eff}$ °C. | $\overline{Mn}$ calc. | $\overline{Mn}$ exp. | $\overline{Mw}/\overline{Mn}$ | Efficiency |
|---|---|---|---|---|---|---|---|---|---|
| 9 | 4 | 95/5 | 1.00 | −24 | −20 | 20000 | 50000 | <1.7 | 0.40 |
| 10 | 6 | 95/5 | 1.00 | −22 | −20 | 20000 | 40000 | <1.3 | 0.50 |

What is claimed is:

1. An initiation system for anionic polymerization of at least one (meth)acrylic monomer and possibly of ethylenically unsaturated monomer(s) that can be copolymerized with these monomers, comprising at least one initiator, with the exception of alkaline metal amides, and at least one alcoholate of the Formula R″OM (I′), wherein:

M represents an alkaline metal, and

R″ represents a group

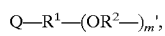
$$Q-R^1-(OR^2-)_{m'},$$

wherein:

Q represents a heterocyclic compound with 5 or 6 chain links comprising 1 or 2 oxygen atoms as the only heteroatom(s), whether or not substituted with an alkyl group with 1 to 8 carbon atoms, a cycloalkyl at $C_5-C_8$ or substituted by and/or condensed to a heterocyclic compound with 5 to 8 chain links comprising 1 or 2 heteroatoms; $R^1$ and $R^2$, identical or different, each representing an alkylene group at $C_1-C_4$, linear or branched, with $R^1$ being bonded to heterocyclic compound Q at α of an oxygen atom, m′ is equal to 1, 2 or 3, and wherein the initiator is monofunctional and corresponds to the formula (R′) p–M′ (II) wherein M′ designates an alkaline metal or alkaline earth metal (valence p of 1 or 2); and R′ designates a straight-chain or branched alkyl radical containing 2 to 8 carbon atoms, or an aryl radical with one or more cycle(s), possibly substituted, or an alkenyl radical at $C_2-C_6$ substituted by an aryl or alkylaryl group or a linear or branched alkyl radical containing 1 to 8 carbon atoms substituted by at least one phenyl group or an alkylaryl radical, wherein the alkyl group has 1 to 8 carbon atoms.

2. The initiation system according to claim 1, wherein the monofunctional initiator is selected from among sec.-butyllithium, n-butyllithium, fluorenyllithium, α-methylstyryllithium, 1,1-diphenylhexyllithium, diphenylmethyllithium or -sodium or -potassium, and 1,1-diphenyl-3-methylpentyllithium.

3. An initiation system for anionic polymerization of at least one (meth)acrylic monomer and possibly of ethylenically unsaturated monomer(s) that can be copolymerized with these monomers, comprising at least one initiator, with the exception of alkaline metal amides, and at least one alcoholate of the Formula ROM (I), wherein:

M represents an alkaline metal, and

R represents a group

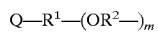
$$Q-R^1-(OR^2-)_m$$

wherein:

Q represents a heterocyclic compound with 5 or 6 chain links comprising 1 or 2 oxygen atoms as the only heteroatom(s), whether or not substituted with an alkyl group with 1 to 8 carbon atoms, a cycloalkyl at $C_5-C_8$ or substituted by and/or condensed to a heterocyclic compound with 5 to 8 chain links comprising 1 or 2 heteroatoms; $R^1$ and $R^2$, identical or different, each representing an alkylene group at $C_1-C_4$, linear or branched, with $R^1$ being bonded to heterocyclic compound Q at α of an oxygen atom m, is equal to 0, 1, 2 or 3, and wherein the initiator is monofunctional and is a compound among the α-lithioisobutyrates.

4. An initiation system for anionic polymerization of at least one (meth)acrylic monomer and possibly of ethylenically unsaturated monomer(s) that can be copolymerized with these monomers, comprising at least one initiator, with the exception of alkaline metal amides, and at least one alcoholate of the Formula ROM (I), wherein:

M represents an alkaline metal, and

R represents a group

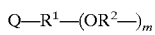
$$Q-R^1-(OR^2-)_m$$

wherein:

Q represents a heterocyclic compound with 5 or 6 chain links comprising 1 or 2 oxygen atoms as the only heteroatom(s), whether or not substituted with an alkyl group with 1 to 8 carbon atoms, a cycloalkyl at $C_5-C_8$ or substituted by and/or condensed to a heterocyclic compound with 5 to 8 chain links comprising 1 or 2 heteroatoms; $R^1$ and $R^2$, identical or different, each representing an alkylene group at $C_1-C_4$, linear or branched, with $R^1$ being bonded to heterocyclic compound Q at α of an oxygen atom, m is equal to 0, 1, 2 or 3, and characterized in that the initiator is difunctional and corresponds to Formula III:

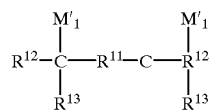

(III)

wherein $M'_1$ is an alkaline metal; and $R^{11}$ represents an organic bivalent radical, aliphatic, cycloaliphatic, aromatic or containing at least one cycloaliphatic or aromatic group, $R^{11}$ may contain substituents, $R^{12}$ and $R^{13}$ each independently represent an organic monovalent radical, whether aliphatic, cycloaliphatic, aromatic or containing at least one cycloaliphatic or aromatic group, $R^{12}$ and $R^{13}$ may contain substituents.

5. The initiation system according to claim 4, wherein the iniator is selected from the group formed 1,1,4,4-tetraphenyl-1,4-dilithioubtane, and 1,1,4,4-tetraphenyl-1,4-disodiobutane.

6. An initiation system for anionic polymerization of at least one (meth)acrylic monomer and possibly of ethylenically unsaturated monomer(s) that can be copolymerized with these monomers, comprising at least one initiator, with the exception of alkaline metal amides, and at least one alcoholate of the Formula ROM (I), wherein:

M represents an alkaline metal, and

R represents a group

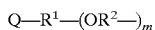
$$Q-R^1-(OR^2-)_m$$

wherein:

Q represents a heterocyclic compound with 5 or 6 chain links comprising 1 or 2 oxygen atoms as the only heteroatom(s), whether or not substituted with an alkyl group with 1 to 8 carbon atoms, a cycloalkyl at $C_5-C_8$ or substituted by and/or condensed to a heterocyclic compound with 5 to 8 chain links comprising 1 or 2 heteroatoms; $R^1$ and $R^2$, identical or different, each representing an alkylene group at $C_1-C_4$, linear or branched, with $R^1$ being bonded to heterocyclic compound Q at α of an oxygen atom, m is equal to 0, 1, 2 or 3, and, wherein the initiator is difunctional and is selected from among the initiator precursors lithium naphthalene, sodium naphthalene, potassium naphthalene and homologues thereof.

7. An initiation system for anionic polymerization of at least one (meth)acrylic monomer and possibly of ethylenically unsaturated monomer(s) that can be copolymerized with these monomers, comprising at least one initiator, with the exception of alkaline metal amides, and at least one alcoholate of the Formula ROM (I), wherein:

M represents an alkaline metal, and

R represents a group

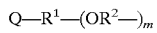
$$Q—R^1—(OR^2—)_m$$

wherein:

Q represents a heterocyclic compound with 5 or 6 chain links comprising 1 or 2 oxygen atoms as the only heteroatom(s), whether or not substituted with an alkyl group with 1 to 8 carbon atoms, a cycloalkyl at $C_5$–$C_8$ or substituted by and/or condensed to a heterocyclic compound with 5 to 8 chain links comprising 1 or 2 heteroatoms; $R^1$ and $R^2$, identical or different, each representing an alklene group at $C_1$–$C_4$, linear or branched, with $R^1$ being bonded to heterocyclic compound Q at α of an oxygen atom, m is equal to 0, 1, 2 or 3, and, wherein the initiator is difunctional and is the reaction product of two organomonolithiated initiator equivalents and 1,3-diisopropenylbenzene.

8. An initiation system for anionic polymerization of at least one (meth)acrylic monomer and possibly of ethylenically unsaturated monomer(s) that can be copolymerized with these monomers, comprising at least one initiator, with the exception of alkaline metal amides, and at least one alcoholate of the Formula ROM (I), wherein:

M represents an alkaline metal, and

R represents a group

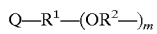
$$Q—R^1—(OR^2—)_m$$

wherein:

Q represents a heterocyclic compound with 5 or 6 chain links comprising 1 or 2 oxygen atoms as the only heteroatom(s), whether or not substituted with an alkyl group with 1 to 8 carbon atoms, a cycloalkyl at $C_5$–$C_8$ or substituted by and/or condensed to a heterocyclic compound with 5 to 8 chain links comprising 1 or 2 heteroatoms; $R^1$ and $R^2$, identical or different, each representing an alkylene group at $C_1$–$C_4$, linear or branched, with $R^1$ being bonded to heterocyclic compound Q at α of an oxygen atom, m is equal to 0, 1, 2 or 3, and, wherein the initiator is a silylated compound.

9. The initiation system according to claim 8, wherein the silylated initiator is monofunctional and of Formula IV:

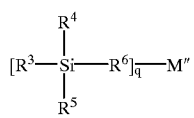

wherein:

$R^3$, $R^4$, $R^5$ each independently represent a linear or branched alkyl radical containing 1 to 8 carbon atoms;

$R^6$ represents a linear or branched alkaylene radical containing 1 to 8 carbon atoms;

M″ designates an alkaline metal or alkaline earth metal (valence q of 1 or 2).

10. The initiation system according to claim 8, wherein the silylated initiator is difunctional and of Formula V:

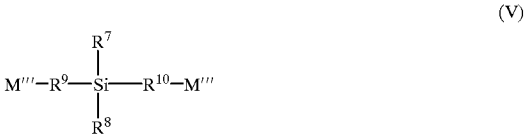

wherein $R^7$ and $R^8$ each independently represent a linear or branched alkyl radical containing 1 to 8 carbon atoms;

$R^9$ and $R^{10}$ each independently represent a linear or branched alkylene radical containing 1 to 8 carbon atoms; and M‴ designates an alkaline metal.

11. The initiation system according to claim 1, wherein the molar ratio of alcoholate/initiator is between 1 and 20, inclusive.

12. An initiation system for anionic polymerization of at least one (meth)acrylic monomer and possibly of ethylenically unsaturated monomer(s) that can be copolymerized with these monomers, comprising at least one initiator, with the exception of alkaline metal amides, and at least one alcoholate of the Formula R″OM (I′), wherein:

R″ represents a group

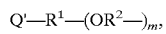
$$Q'—R^1—(OR^2—)_{m'},$$

wherein:

Q′ is selected from the group formed by tetrahydrofuranyl-2-, 5-methyltetrahydrofuranyl-2-, tetrahydropyranyl-2-, 1,3-dioxolanyl-2-, 1,3-dioxolanyl-5-, 1,3-dioxanyl-2-, 1,3-dioxanyl-6-, 1,4-dioxanyl-2-, 1,4-dioxaspiro[4,5]decan-2-yl-, 1,7-dioxaspiro[5,5]undecan-2-yl, and 1,5,7,11-tetraoxaspiro[5,5]-undecan-2-yl;

$R^1$ and $R^2$ are methylene, ethylene, butylene, propylene, or isopropylene groups; m′ is equal to 1, 2 or 3; and M is lithium, and wherein the initiator is monofunctional and corresponds to the formula

$$(R')_p—M' \qquad (III)$$

wherein M′ designates an alkaline metal or alkaline earth metal (valence p of 1 or 2); and R′ designates a straight-chain or branched alkyl radical containing 2 to 8 carbon atoms, or an aryl radical with one or more cycle(s), possibly substituted, or an alkenyl radical at $C_2$–$C_6$ substituted by an aryl or alkylaryl group or a linear or branched alkyl radical containing 1 to 8 carbon atoms substituted by at least one phenyl group or an alkylaryl radical, wherein the alkyl group has 1 to 8 carbon atoms.

13. An initiation system for anionic polymerization of at least one (meth)acrylic monomer and possibly of ethylenically unsaturated monomer(s) that can be copolymerized with these monomers, comprising at least one initiator, with the exception of alkaline metal amides, and at least one alcoholate of the Formula ROM (I), wherein:

R represents a group

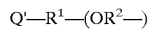
$$Q'—R^1—(OR^2—)$$

wherein Q′ is selected from the group formed by tetrahydrofuranyl-2-, 5-methyltetrahydrofuranyl-2-, tetrahydropyranyl-2-, 1,3-dioxolanyl-2-, 1,3-dioxolanyl-5-, 1,3-dioxanyl-2-, 1,3-dioxanyl-6-, 1,4-dioxanyl-2-, 1,4-dioxaspiro[4,5]decan-2-yl-, 1,7-dioxaspiro[5,5]undecan-2-yl, and 1,5,7,11-tetraoxaspiro[5,5]-undecan-2-yl;

$R^1$ and $R^2$ are methylene, ethylene, butylene, propylene, or isopropylene groups; m is equal to 0, 1, 2 or 3; and M is lithium, and characterized in that the initiator is difunctional and corresponds to Formula III:

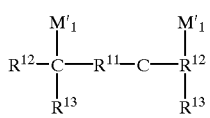
(III)

wherein $M'_1$ is an alkaline metal; and $R^{11}$ represents an organic bivalent radical, aliphatic, cycloaliphatic, aromatic or containing at least one cycloaliphatic or aromatic group, $R^{11}$ may contain substituents, $R^{12}$ and $R^{13}$ each independently represent an organic monovalent radical, whether aliphatic, cycloaliphatic, aromatic or containing at least one cyloaliphatic or aromatic group, $R^{12}$ and $R^{13}$ may contain substituents.

14. The initiation system according to claim 13, wherein the alcoholate is lithium tetrahydrofuranyl-2-methoxylate or -2-ethoxylate.

15. The initiation system according to claim 4, wherein the molar ratio of alcoholate/initiator is between 1 and 20, inclusive.

16. An initiation system for anionic polymerization of at least one (meth)acrylic monomer and possibly of ethylenically unsaturated monomer(s) that can be copolymerized with these monomers, comprising at least one initiator, with the exception of alkaline metal amides, and at least one alcoholate of the Formula R"OLi (I"), wherein:

R" represents a group $Q'—R^1—(OR^2—)_{m'}$, wherein:
Q' is selected from the group formed by tetrahydrofuranyl-2-, 5-methyltetrahydrofuranyl-2-, tetrahydropyranyl-2-, 1,3-dioxolanyl-2-, 1,3-dioxolanyl-5-, 1,3-dioxanyl-2-, 1,3-dioxanyl-6-, 1,4-dioxanyl-2-, 1,4-dioxaspiro[4,5]decan-2-yl-, 1,7-dioxaspiro[5,5]undecan-2-yl, and 1,5,7,11-tetraoxaspiro[5,5]-undecan-2-yl;

$R^1$ and $R^2$ are methylene, ethylene, butylene, propylene, or isopropylene groups;

m' is equal to 1, 2 or 3; and wherein the initiator is monofunctional and corresponds to the formula $(R')_p-M'$ (II)

wherein M' designates an alkaline metal or alkaline earth metal (valence p of 1 or 2); and R' designates a straight-chain or branched alkyl radical containing 2 to 8 carbon atoms, or an aryl radical with one or more cycle(s), possibly substituted, or an alkenyl radical at $C_2$–$C_6$ substituted by an aryl or alkylaryl group or a linear or branched alkyl radical containing 1 to 8 carbon atoms substituted by at least one phenyl group or an alkylaryl radical, wherein the alkyl group has 1 to 8 carbon atoms.

17. The initiation system according to claim 3, wherein the molar ratio of alcoholate/initiator is between 1 and 20, inclusive.

18. The initiation system according to caim 6, wherein the molar ratio of alcoholate/initiator is between 1 and 20, inclusive.

19. The initiation system according to claim 7, wherein the molar ratio of alcoholate/initiator is between 1 and 20, inclusive.

20. The initiation system according to claim 8, wherein the molar ratio of alcoholate/initiator is between 1 and 20, inclusive.

21. The initiation system according to claim 12, wherein the molar ratio of alcoholate/initiator is between 1 and 20, inclusive.

22. The initiation system according to claim 13, wherein the molar ratio of alcoholate/initiator is between 1 and 20, inclusive.

23. The initiation system according to claim 16, wherein the molar ratio of alcoholate/initiator is between 1 and 20, inclusive.

24. An initiation system for anionic polymerization of at least one (meth)acrylic monomer and possibly of ethylenically unsaturated monomer(s) that can be copolymerized with these monomers, comprising at least one initiator, with the exception of alkaline metal amides, and at least one alcoholate of the Formula R'" OLi (I'"), wherein:

R'" represents a group $Q'—R^1$ wherein:
Q' is selected from the group formed by tetrahydrofuranyl-2-, 5-methyltetrahydrofuranyl-2-, tetrahydropyranyl-2-, 1,3-dioxolanyl-2-, 1,3-dioxolanyl-5-, 1,3-dioxanyl-2-, 1,3-dioxanyl-6-, 1,4-dioxanyl-2-, 1,4-dioxaspiro[4,5]decan-2-yl-, 1,7-dioxaspiro[5,5]undecan-2-yl, and 1,5,7,11-tetraoxaspiro[5,5]-undecan-2-yl;

$R^1$ is methylene, ethylene, butylene, propylene, or isopropylene groups; and wherein the initiator is monofunctional and corresponds to the formula $(R^3)_p-M'$ (II')

wherein M' designates an alkaline metal or alkaline earth metal (valence p of 1 or 2); and $R^3$ designates an aryl radical with one or more cycle(s), possibly substituted, or an alkenyl radical at $C_2$–$C_6$ substituted by an aryl or alkylaryl group or a linear or branched alkyl radical containing 1 to 8 carbon atoms substituted by at least one phenyl group or an alkylaryl radical, wherein the alkyl group has 1 to 8 carbon atoms.

* * * * *